United States Patent [19]

Stein et al.

[11] 4,137,210

[45] Jan. 30, 1979

[54] METHOD OF COLD-SHAPING OF MIXTURES COMPRISING POLY[2.2.1]BICYCLO-2-HEPTENE OR ITS SHORT-CHAIN

[75] Inventors: Claude Stein, Verneuil-en Halatte; Patrick le Delliou, Issy-les-Moulineaux, both of France

[73] Assignee: Societe Chimique des Charbonnages, Courbevoie, France

[21] Appl. No.: 857,836

[22] Filed: Dec. 5, 1977

Related U.S. Application Data

[63] Continuation-in-part of Ser. No. 659,684, Feb. 20, 1976, abandoned.

[30] Foreign Application Priority Data

Feb. 27, 1975 [FR] France ............................... 75 06213

[51] Int. Cl.$^2$ ............................................. C08K 5/12
[52] U.S. Cl. ...................... 260/31.2 R; 260/31.8 HR; 260/33.6 UA
[58] Field of Search .................... 526/281; 260/31.2 R, 260/33.6 PQ, 33.6 UA, 31.8 HR

[56] References Cited

U.S. PATENT DOCUMENTS

| 2,932,630 | 4/1960 | Robinson | 526/281 |
| 3,676,390 | 7/1972 | Vergne | 260/33.6 UA |
| 4,020,021 | 4/1977 | Lahouste | 526/281 |

FOREIGN PATENT DOCUMENTS

1230597  5/1971  United Kingdom.

*Primary Examiner*—Paul R. Michl
*Attorney, Agent, or Firm*—Karl W. Flocks

[57] ABSTRACT

The invention relates to a method of cold-shaping of mixtures comprising poly[2.2.1]bicyclo 2-heptene, said method comprising the steps of: bringing poly[2.2.1-]bicyclo 2-heptene, in the form of a powder having an apparent density of 0.2 to 0.5 and preferably from 0.2 to 0.35 into contact with at least one compound having a relatively low volatility from the group of esters, relatively heavy hydrocarbon and mixture of hydrocarbons; effecting an intimate mixture of these two constituents; shaping or moulding the resulting mixture rapidly before its jellification; and leaving to jellify at room temperature.

13 Claims, No Drawings

METHOD OF COLD-SHAPING OF MIXTURES CMPRISING POLY[2.2.1]BICYCLO-2-HEPTENE OR ITS SHORT-CHAIN

FIELD OF INVENTION

This is a Continuation-in-Part of copending application Ser. No. 659,684 filed Feb. 20, 1976 now abandoned.

The present invention relates to a method of cold-shaping of mixtures comprising poly (2.2.1) bicyclo 2-heptene or its short-chain substitution derivatives.

It is known that (2.2.1) bicyclo 2-heptene and its short-chain substitution derivatives can give polymers, some of which are completely amorphous and obtained by polymerization with ring opening in the presence of a catalyst system comprising a compound of a noble metal of ruthenium, osmium and iridium group in alcoholic solvents (see F. W. MICHELOTTI and W. P. KEAVENEY — Journal of Polymer Science : Part A, vol. 3 pp 895 – 905 (1965)).

Now, such a polymer may be converted into an elastomer by incorporating substances of low volatility selected from esters such as di-octyl phthalate, di-octyl sebacate, butyl oleate etc and hydrocarbons or mixtures of relatively heavy hydrocarbons such as described by VERGNE et al in U.S. Pat. No. 3,676,390. Referring to teaching of said reference, this incorporation is advantageously effected in an internal mixer or in a roller mixer at a temperature of the order of 80° C to reduce the viscosity of the polymer. The resulting solid compositions may be moulded by compression, transfer or injection, generally between 140° and 185° C.

It is also known that ring opened polymer of (2.2.1) bicyclo 2-heptene and its short-chain substitution derivatives may be obtained in the form of finely divided powder having an apparent density of 0.2 to 0.8 and preferably of 0.25 to 0.4 (see LAHOUSTE et al U.S. Pat. No. 4,020,021). Such polymers are obtained by using a catalyst system selected from the group consisting of noble metal compound with a reducing substance and tungsten compound with a compound having at least one metal-hydrocarbon link, the preferred catalyst system being constituted by ruthenium trichloride dissolved in n-butanol.

Now, the Applicants have surprisingly found that when a finely divided polymer of the LAHOUSTE type, especially an amorphous polymer obtained using a noble metal compound with a reducing substance as the catalyst system (i.e. a MICHELOTTI catalyst system) and having an apparent density from 0.2 to 0.5 and preferably from 0.2 to 0.35, is simply intimately mixed at room temperature with the low volatility substances such as those used by VERGNE et al, there is obtained a mass which remains fluid for a certain period of time and then solidifies even at room temperature. This phenomenon is quite unexpected and unobvious in view of VERGNE et al teaching since in VERGNE method the intimate mixing operation is carried out with heating and the resulting mixed composition is solid so that any moulding process has to be carried out at relatively high temperature as mentioned above. But even in this case, casting is not always possible and it is frequently necessary to carry out the mouldings by compression, injection etc.

On the contrary the above mentioned unexpected fluidity of the mixture permits to provide a method of cold shaping during the period of time when the mass to be shaped is still fluid without the need of heating and without the need of compression or injection devices.

Thus the present invention eliminates the prior art drawbacks including those resulting from the use of internal mixers or roller mixers, of heating devices as well as compression or injection devices and provides a practical and rapid method of moulding at ambient temperature, irrespective of the material which constitutes the mould.

According to this method a poly (2.2.1) bicyclo 2-heptene or one of its short-chain substitution derivatives of the LAHOUSTE type in the form of a powder of apparent density from 0.2 to 0.5, preferably from 0.2 to 0.35 is contacted with at least one compound of low volatility selected from esters such as di-octyl phthalate, di-octyl sebacate, butyl oleate, and hydrocarbons or mixtures of relatively heavy hydrocarbons, (i.e hydrocarbons having low vapor pressure at room temperature) an intimate mixture of these two constituents is effected at room temperature while the mass is fluid, the resulting mixture is casted shaped or molded before its jellification and it is allowed to jellify at room temperature.

Among the low volatile compounds applicable to the invention, there may be used those cited in VERGNE et al U.S. Pat. No. 3,676,390, incorporated herein as reference.

In accordance with a preferred embodiment, mixtures of aliphatic, aromatic and/or naphthenic hydrocarbons derived from petroleum or coaltar and more preferably mixtures of naphthenic and/or aromatic type are used.

The period during which the mass will remain sufficiently fluid to be capable of being casted or shaped depends on the nature and on the quantity of the low volatile compound. Good results will generally be obtained by using 100 to 450 parts by weight of said preferred compounds for 100 parts by weight of poly (2.2.1) bicyclo 2-heptene. For most applications, a proportion of 250 to 350 parts of said compounds to 100 parts of polymer will be particularly advantageous. There will preferably be employed a polymer having a particulate size less than 2-3 mm.

Fluid compositions capable of being shaped or casted may be obtained by adding the polymer to the liquid compounds while stirring. It is also especially possible to pour the polymer over a layer of liquid or the liquid over a thin layer of polymer.

When the mechanical properties of the finished object so require, it is possible to add previously to the polymer or to the low volatile material, curing agents such as sulphur, accelerators or peroxides, capable of curing the jellified mass, after the cold shaping operation, either at room temperature or during a subsequent heat treatment. It is of course also possible to add fillers, preferably having little absorption of oils, or having received an oil-resistant treatment, fireproofing products, and the like.

The invention is particularly applicable:

In the building construction field for:
- sound insulation of the conduits and water pipes with respect to the floorings and ceilings;
- the production of floating floors;
- the production of joints at the level of sanitary equipment;

In the mechanical and electro-mechanical field for the manufacture by casting of sole-plates for light equipments for the purpose of insulating against vibrations;

In the packing field for coating tools or fragile articles.

The examples which follow will bring out more clearly the scope and advantages of the invention, the polymer used being obtained by the process described by LAHOUSTE et al (U.S. Pat. No. 4,020,021) with a catalyst system comprising ruthenium trichloride dissolved in n-butanol.

EXAMPLE 1

(a) There are placed in two separate vessels:
- 200 grams of poly (2.2.1) bicyclo 2-heptene having an apparent density of 0.27 and a particulate size of 0.1 to 2 mm;
- 500 grams of aromatic petroleum oil "Exarol" of the Compagnie Francaise de Raffinage), having a pour point lower than +5° C and a Engler viscosity measured at 50° C between 4 and 7;

(b) The oil is gradually added to the polymer while stirring by means of a spatula.

The consistency of the mixture obtained is very fluid immediately after the addition, and its viscosity increases as and when the oil is absorbed. This phenomenon is however such that at the end of 2 to 3 minutes, the mixture remains perfectly pourable into a mould.

(c) This mould is constituted by a cylindrical cavity of 100mm. in diameter, in which a tube with an external diameter of 80 mm. has been arranged in a centered manner.

The fluid mass is poured 3 minutes after the mixing of the constituents, into the interstitial space of this device, until it is completely full.

The whole is left to rest for 20 minutes at the room temperature. The jellification take place and continues up to complete plastification.

At the end of 20 minutes, the tube provided with its coating of 10 mm. in thickness is removed from the mould. This coating has no sticky nature and has good mechanical properties with respect to compression and tearing. The consistency of the coating corresponds to a Mooney index of about 38 at 100° C.

EXAMPLE 2

The operation is carried out as in Example 1, except that in phase (b) the polymer is added gradually to the oil kept under stirring.

The result obtained is equivalent to that of Example 1.

EXAMPLE 3

The operation is carried out as in Example 1, but there is previously added to the polybicyclo-heptene in a powder mixing machine, 2% of sulphur and 2% of sulfinamide accelerator of the type "CBS" (cyclohexylbenzothiazylsulfinamide).

After jellification of the mass in the mould, this latter is placed in an oven at 150° C. for 30 minutes.

The coating of the tube thus obtained has an increased resistance to flow in the hot state, due to its curing.

EXAMPLE 4

This example illustrates the application of the method of the invention to the manufacture of floating floorings in the building industry.

Over a layer of concrete of 10 cm. in thickness there is casted the fluid mixture prepared as in Example 1, and the casted layer is spread out by means of a thickness shaped in such a manner that the fluid layer is uniformly distributed with a thickness of 2 mm.

Complete setting takes place after about 20 to 30 minutes, at the end of which period a layer of concrete of 4 mm. in thickness is poured.

The device of the "floating floor" type thus obtained is satisfactory from the point of view of impact noises, corresponding to the minimum coefficient of attenuation of $\alpha = 21$.

EXAMPLE 5

An alternative form of the previous example consists of uniformly spreading the powdered polybicycloheptene over the flooring in proportion of 500 grams per sq. m. and spraying the oil over this by means of an appropriate pump at the rate of 1250 grams per sq. m. The coating obtained gradually jellifies, as in the previous case.

The invention is also operable by using, in the above example instead of "EXAROL", an oil of the paraffinic type such as "SUNPAR 115" oil from SUN OIL COMPANY, an oil of the aromatic type such as "DUTREX" oils from SHELL COMPANY, and "SUNDEX 790" from SUN OIL COMPANY, an oil of the naphthenic type such "CIRCOLIGHT PROCESS OIL", "CIRCOSOL 380" oil from SUN OIL COMPANY, "SUNTHENE 4240" and "255" from SUN OIL COMPANY and "FLEXON 766" from EXXON COMPANY, or even an oil of alkylated synthetic type such as "KETTLITZ PM" or "NS" from KETTLITZ CHEMIE G.m.b.H., an hydrogenate of coaltar fractions as well as mixtures of at least two of these oils, or mixtures of at least one of them with esters of the above described type.

It will be understood that the present invention has been described purely by way of explanation and not in any restrictive sense, and that any useful modification may be made thereto without thereby departing from its scope as defined by the appended Claims.

We claim:

1. A method of cold-shaping of mixtures comprising poly (2.2.1) bicyclo 2-heptene said method comprising the steps of : bringing a powder of finely divided ring opened poly (2.2.1) bicyclo 2-heptene having an apparent density of 0.2 to 0.5 and obtained by polymerizing (2.2.1) bicyclo 2-heptene in the presence of a catalyst system selected from the group consisting of a noble metal compound with a reducing substance and a tungsten compound with a compound having at least one metal hydrocarbon link, into contact at room temperature with at least one compound of low volatility from the group consisting of the organic esters derived from aliphatic and cyclanic alcohols, the aliphatic, aromatic and naphthenic hydrocarbons and their mixtures, the proportions being 100-450 parts by weight of said low volatility compounds per 100 parts of said polymer; effecting at room temperature an intimate mixture of these constituents; shaping or moulding the resulting fluent mixture before its jellification and leaving the shaped mixture to jellify at room temperature.

2. A method in accordance with claim 1 wherein said powder has an apparent density of 0.2 to 0.35.

3. A method in accordance with claim 2 wherein said powder has been obtained by ring opening polymerization in the presence of a noble metal compound selected from the group of ruthenium, osmium and iridium compounds in an alcoholic solvent.

4. A method in accordance with claim 3 wherein said powder has been obtained by ring opening polymerization in the presence of ruthenium trichloride dissolved in n-butanol.

5. A method in accordance with claim 3 wherein said intimate mixture is carried out by mechanical stirring.

6. A method in accordance with claim 3 wherein said low volatile compound is poured over a layer of said poly (2.2.1) bicyclo 2-heptene compound.

7. A method in accordance with claim 3 wherein said poly (2.2.1) bicyclo 2-heptene is poured over a layer of said low volatile compound.

8. A method in accordance with claim 3 wherein said poly (2.2.1) 2-heptene powder has a particulate size essentially less than 3 mm.

9. A method in accordance with claim 3 wherein said low volatile compound is a petroleum product.

10. A method in accordance with claim 9 wherein said petroleum product is an aromatic oil.

11. A method in accordance with claim 9 wherein said petroleum product is a naphthenic oil.

12. A method in accordance with claim 9 wherein the proportions of said petroleum product is from 250 to 350 parts by weight per 100 parts of said polymer.

13. A method in accordance with claim 1 wherein said low volatile compound is an ester selected from the group comprising di-octyl phthalate, di-octyl sebacate and butyl oleate.

* * * * *